(12) United States Patent
Schlegel et al.

(10) Patent No.: US 7,715,485 B1
(45) Date of Patent: May 11, 2010

(54) MIMO COMMUNICATION USING INTERFERENCE CANCELLATION AND UNEQUAL TRANSMIT POWER DISTRIBUTION

(75) Inventors: Christian Schlegel, Park City, UT (US); Zachary C. Bagley, Salt Lake City, UT (US)

(73) Assignee: L-3 Communications, Corp., New York, NY (US)

( * ) Notice: Subject to any disclaimer, the term of this patent is extended or adjusted under 35 U.S.C. 154(b) by 722 days.

(21) Appl. No.: 11/651,171

(22) Filed: Jan. 8, 2007

(51) Int. Cl.
*H04K 1/10* (2006.01)
*H04L 27/28* (2006.01)
(52) U.S. Cl. ..................... 375/260; 455/522
(58) Field of Classification Search ......... 375/259–260, 375/295, 299, 316, 347; 455/522, 574, 127.5, 455/450; 370/318, 329
See application file for complete search history.

(56) References Cited

U.S. PATENT DOCUMENTS

| | | | | |
|---|---|---|---|---|
| 6,127,971 | A * | 10/2000 | Calderbank et al. | 342/368 |
| 6,751,187 | B2 | 6/2004 | Walton et al. | |
| 6,859,503 | B2 * | 2/2005 | Pautler et al. | 375/299 |
| 6,940,917 | B2 | 9/2005 | Menon et al. | |
| 7,020,110 | B2 * | 3/2006 | Walton et al. | 370/334 |
| 7,099,678 | B2 * | 8/2006 | Vaidyanathan | 455/500 |
| 7,555,035 | B2 * | 6/2009 | Shi et al. | 375/211 |
| 2004/0076224 | A1 * | 4/2004 | Onggosanusi et al. | 375/144 |
| 2005/0265281 | A1 | 12/2005 | Ketchum | |
| 2006/0269022 | A1 * | 11/2006 | Li et al. | 375/347 |
| 2007/0110135 | A1 * | 5/2007 | Guess et al. | 375/148 |
| 2008/0285670 | A1 * | 11/2008 | Walton et al. | 375/260 |

OTHER PUBLICATIONS

Shen et al. "On the performance of V-BLAST with zero-forcing successive interference cancellation receiver", IEEE Communications Society, 2004, pp. 2818-2822.
Reed et al. "Iterative multiuser detection for CDMA with FEC: near-single-user performance", IEEE, 1998, pp. 1693-1699, vol. 46, No. 12.
Grant et al. "Convergence of linear interference cancellation multiuser receivers", IEEE, 2001, pp. 1824-1834, vol. 49, No. 10.
Foschini et al. "Simplified processing for high spectral efficiency wireless coummunication employing multi-element arrays", IEEE, 1999, pp. 1841-1852, vol. 17. No. 11.
Golden et al "Detection algorithm and initial laboratory results using V-BLAST a space-time communication architecture", Electronics Letters, 1999, pp. 1-2, vol. 35. No. 1.
Andrews et al. "Interference cancellation for cellualar systems: a contemporary overview", IEEE, 2005, pp. 19-29.
Palomar et al. "Uniform power allocation in MIMO channels: a game-theoretic approach" IEEE, 2003, pp. 1707-1727, vol. 49, No. 7.

(Continued)

*Primary Examiner*—Jean B Corrielus
(74) *Attorney, Agent, or Firm*—Kirton & McConkie; William T. Ralston

(57) ABSTRACT

Communication of data over a multiple-input multiple-output (MIMO) channel includes allocating transmission power unequally to the different data streams. The transmission power allocation is performed without regard to a state of a changing channel response of the MIMO channel. A relatively low complexity interference cancelling receiver can therefore decode the data streams.

19 Claims, 3 Drawing Sheets

OTHER PUBLICATIONS

Schlegel et. al. "Optimal power allocation and code selection in iterative detection of random CDMA," pp. 1-4; 2004 International Zurich Seminar on Digital Communications, Zurich, Switzerland, Feb. 2004.

Wang et al "Power allocation for dual transmit antenna spatial multiplexing systems" pp. 1-3; Proc. 22nd Biennial Symp. Comm., Kingston, May 2004.

Sellathurai et al "Approaching near-capacity on a multi-antenna channel using multirate encoding and successive decoding receivers" pp. 1-4; ITW2003, Paris, France, Mar. 31-Apr. 4, 2003.

Teletar "Capacity of multi-antenna Gaussian channels" Lucent Technologies, pp. 1-28; Bell Laboratories Technical Memorandum, Feb. 2, 1999.

* cited by examiner

MIMO COMMUNICATION USING INTERFERENCE CANCELLATION AND UNEQUAL TRANSMIT POWER DISTRIBUTION

FIELD OF THE INVENTION

The present invention relates generally to communication using a multiple-input multiple-output (MIMO) communication channel. More particularly, the present invention relates to transmission using unequal power distribution and reception using interference cancellation.

BACKGROUND

Multiple-input multiple-output (MIMO) communications systems use multiple antennas at the transmitter and receiver to provide increased throughput through a communication channel. In theory, the available capacity of a radio channel can increase linearly with the minimum number of antennas at either the transmitter or receiver. Unfortunately, complex signal processing is generally required in order to obtain the increased throughput.

One optimal solution for MIMO communications uses so-called pre-coding or beam forming and the so-called water-filling method to assign transmission power levels. The water-filling method uses knowledge of the channel response to determine optimal transmission power assignments to the transmit antennas. Channel response information is not directly available to the transmitter. Furthermore, the channel response can be actively changing. Therefore, the receiver typically estimates the channel response and feeds back the channel response information to the transmitter. Delays or errors in obtaining the channel response information (also referred to as channel state), however, reduce the performance of this approach. The estimation of channel response and feedback of channel state information also adds complexity to the overall communication systems.

A less complex alternative avoids requiring knowledge of the channel state at the transmitter. In the absence of channel state information at the transmitter, an optimal technique is for the transmitter to assign the same power to each antenna. The receiver can use maximum likelihood detection to maximize the performance. Unfortunately, maximum likelihood decoding is complex, and the complexity increases exponentially with the number of antennas.

SUMMARY OF THE INVENTION

It has been recognized that it would be advantageous to develop an improved technique for communication through a MIMO communication channel.

One embodiment of the invention includes a method for communicating data over a MIMO channel having a changing channel response. The method includes separating the data into a plurality of data streams and allocating transmission power to each of the plurality of data streams. The allocated power is unequally distributed to the plurality of data streams without regard to state of the changing channel response. The method can include receiving the plurality of data streams using an interference cancelling receiver.

Additional features and advantages of the invention will be apparent from the detailed description which follows, taken in conjunction with the accompanying drawings, which together illustrate, by way of example, features of the invention.

DETAILED DESCRIPTION

Figure 1:
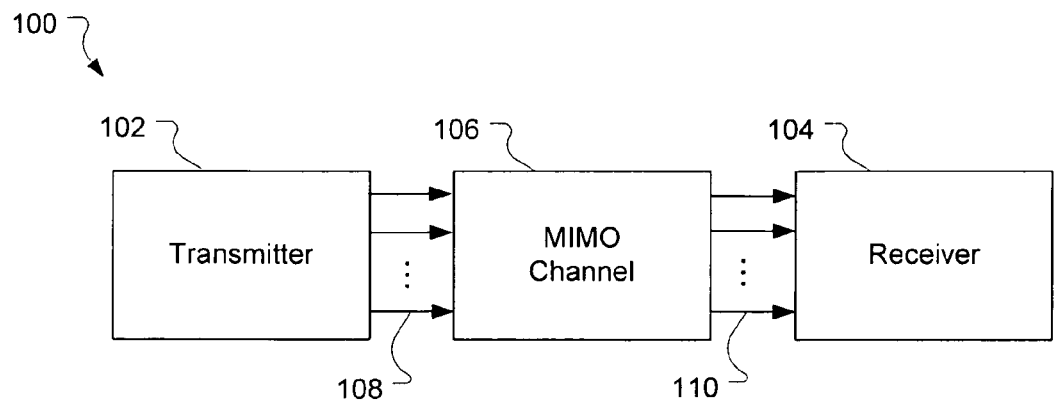
FIG. 1 is a block diagram of a system for communicating data over a multiple-input multiple-output (MIMO) channel in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

For mathematical representations herein, scalars are represented by lower case characters (e.g., y(t)), vectors by lower case bold characters (e.g., x), and matrices by upper case bold characters (e.g., H). The variable t represents time. The notation $\{x_i\}$ represents a set of variables $x_i$ which can be written in vector form as x.

FIG. 1 illustrates a system for communicating data over a multiple-input multiple-output (MIMO) communication channel. The system, shown generally at 100, includes a transmitter 102 and a receiver 104 in communication via the MIMO channel 106. The MIMO channel has a changing channel response, in that the channel transfer function varies with time. In other words, how the channel transforms the channel inputs 108 into the channel outputs 110 varies with time.

The output from a MIMO channel can be expressed mathematically as a vector y(t) of the received signals, $y(t)=\{y_i(t)\}=\{y_1(t), y_2(t), \ldots y_j(t)\}$, where $y_i(t)$ represents the signal from receive antenna i, given by $$y(t)=H(t)x(t)+z(t)$$

where x(t) is a vector of the transmitted signals, $x(t)=\{x_i(t)\}=\{x_1(t), x_2(t), x_j(t)\}$, $x_i(t)$ represents the signal into transmit antenna i, j is the number of receive antennas, k is the number of transmit antennas, H(t) is the channel response and z(t) represents noise. The matrix H is a k row by j column matrix and may be referred to as the channel response or channel transfer function. The value of the matrix H at a particular instant in time is also known as the channel state or active channel state.

Figure 2:
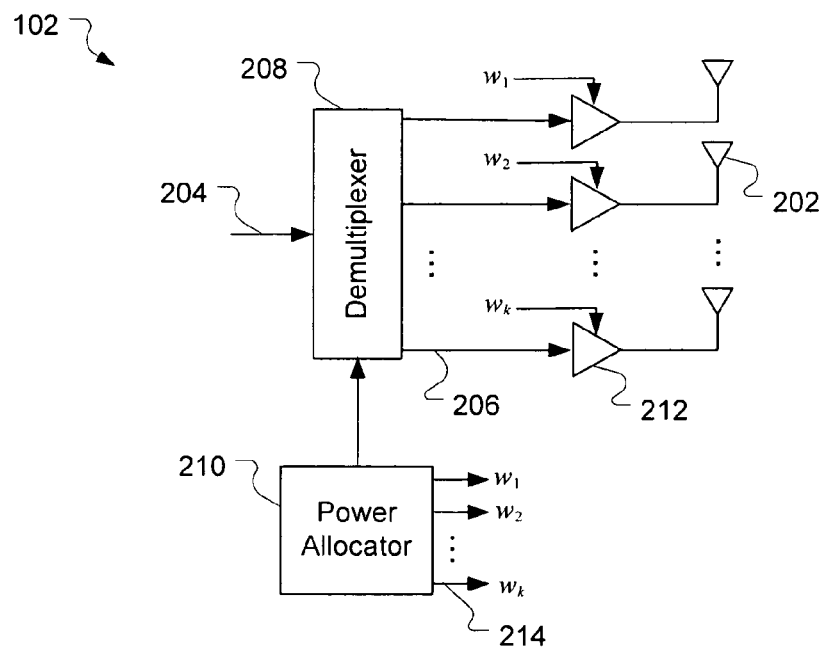
FIG. 2 is a block diagram of a system for transmission of data over a MIMO channel in accordance with an embodiment of the present invention.

FIG. 2 illustrates the transmitter 102 in further detail in accordance with one exemplary embodiment of the present invention. The transmitter includes k transmit antennas 202, each antenna being used for transmission of one of k data streams. The transmitter includes means for separating the data d(t) into a plurality of data streams $d(t)=\{d_i(t)\}$, i=1 . . .

k. For example, separating the data into plural data streams can be performed by demultiplexing the data 204 into k separate data streams 206 using a demultiplexer 208. The transmitter may also include means for unequally allocating transmission power $\{w_k\}$ to the plurality of data streams without regard to state of the channel response, such as power allocator 210. The transmitter can include variable gain elements 212 which assign transmission power to the data streams based on the transmission power levels 214 assigned by the power allocator.

Various ways of implementing the variable gain elements 212 are possible. The variable gain elements may be implemented in either the digital domain or analog domain, for example, using a multiplier, variable gain amplifier, or the like. The transmitter 102 may include digital electronics to provide demultiplexing, data formatting, forward error correction encoding, space-time coding, modulation generation, signal scaling, and the like. The transmitter may also include analog electronics to provide carrier generation, mixing, amplification, frequency translation, and the like.

The power allocator 210 unequally distributes transmission power to each of the plurality of data streams 206. The transmission power levels 214 are unequally allocated in that they are not all set to the same value. In other words, the transmission power is not uniformly divided among the data streams. Generally, it is desirable to maintain the total transmission power, $w_T$, constant as equipment limitations may limit the available total transmit power, i.e.

$$\sum_i w_i \le w_T.$$

The allocation of power to the data streams is performed without regard to state of the changing channel response H(t). In other words, the power allocator does not require channel state information. Channel state information refers to knowledge of the state of the channel response H at a particular time t. Instead, the power allocator allocates the transmission power at time t independently of the actual state H(t) of the channel response. This helps to simplify the system, since feedback from the receiver to the transmitter can be avoided.

In contrast, previous MIMO systems have either allocated equal amounts of transmit power to all of the data streams, or have allocated transmit power to the data streams using the water-filling method based on the active state of the channel response. The active state of the channel response can be difficult to obtain. In water-filling, Eigen modes of the channel response are obtained and used to determine optimal distributions and phasing of transmission power for the data streams. For example, the correlation matrix for the channel response H(t) may be estimated by the receiver based on reception of probe or pilot sequences sent by the transmitter. The receiver can feed back channel state information to the transmitter. The channel state information used at the transmitter is delayed relative to the actual active channel state due to processing latency in estimating the channel response, transport time for feedback of channel response, and processing latency for solving the water-filling. Accordingly, the actual power distributions used in water-filling can be suboptimal if the channel state changes rapidly relative to the overall delay in feeding back the channel state information.

The system 100 (FIG. 1) can avoid the overhead and complexity of channel state feedback since the transmission powers are assigned without using knowledge of the channel state. Transmission power can be allocated, for example, using a predetermined set of transmission powers. For example, for a total transmission power $W_T=1$, transmission power allocations may be about ½, ¼, ⅛, 1/16, etc. The assignment of different transmission power values to the data streams may be random, pseudorandom or sequential. For example, a particular set of transmission powers may be periodically rotated or permuted across the different transmit antennas. The rotation or permutation may use a predefined ordering, pseudorandom ordering, or sequential ordering. More particularly, data may be organized into blocks using a predetermined time interval. Each time interval may use a set of transmission power levels that are changed every interval boundary. Various time intervals and block sizes can be used. Optimal time intervals and block sizes may exist, depending on the channel response statistics and error correction coding used. Determination of optimal parameters can be done numerically, based on models of the system components and channel.

Transmission power levels may alternately be selected using a random process. For example, power levels for the data streams may be chosen using various distributions, including for example a geometric distribution or an exponential distribution. As the channel loading increases, it is currently believed that increasing the variance in the distribution of transmission powers may provide better performance. It will be appreciated that it may be desirable to perform a normalization operation on the transmission power levels after selection from the random process to provide a constant total power. The type of interference cancelling receiver and its performance characteristics may also affect the choice of distribution used.

As another example, transmission power levels may be selected based on long term statistics of the channel response. For example, depending on the long term statistics of the channel response, different random distributions for the transmit power levels may achieve differing performance. The random distribution used for the transmit power level may therefore be selected based on knowledge of the long term statistics of the channel response. Long term statistics of the channel response may be known a priori, or may be determined by the receiver and fed back to the transmitter using a low data rate channel. Unlike channel state information, which can change rapidly, long term statistics of the channel response are constant or change very slowly. Hence, communication of the long term channel statistics need not be in real time. Accordingly, less overhead is required to communicate the long term statistics from the receiver to the transmitter than is the case for the water-filling method.

The transmitter 210 may include means for communicating the transmission power levels $\{w_i\}$ to the receiver. For example, the power allocator 210 may include transmission power level information 216 into the data being transmitted as described further below.

Figure 3:
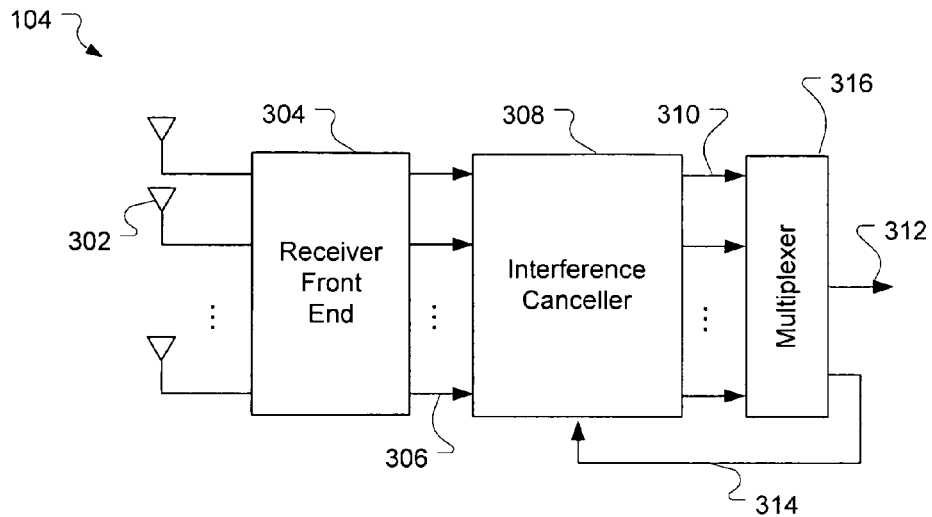
FIG. 3 is a block diagram of a system for reception of data over a MIMO channel in accordance with an embodiment of the present invention.

Returning to FIG. 1, the system 100 includes means for receiving the plurality of data streams using an interference cancelling receiver, for example, a receiver 104. As shown in further detail in FIG. 3, in accordance with an embodiment of the present invention, the receiver may include a plurality of receive antennas 302. The receive antennas may be coupled to a receiver front end 304 to provide a plurality of receive signals 306. The receiver front end may include amplification, frequency translation, automatic gain control, and similar functions. The receiver front end may also include digitization and pre-processing. The receive signals are provided to an interference canceller 308. The interference canceller extracts a plurality of receive data streams 310 from the received signals as described further below.

The receiver may also include a multiplexer 316 to reassemble the receive data streams 310 into a single data stream 312. Information 314 related to the transmission power levels may also be extracted and used in the interference canceller 308.

The interference canceller 308 can provide excellent performance given the non-uniform power allocations provided to the transmit data streams. This is because interference cancellers tend to perform better when the receive data streams have different signal to noise ratios, particularly when the number of transmit antennas (k) is greater than the number of receive antennas (j). It has been found that the interference canceller 308 can achieve most of the theoretically available performance on a MIMO channel without the high complexity cost associated with other techniques. For example, maximum likelihood decoding and sphere decoding can provide better performance than the interference canceller in some conditions, but require significantly more complexity.

Various interference canceller implementations can be used. While interference cancellation techniques can be applied to cancel cross-correlation noise in spread-spectrum and to cancel inter symbol interference, interference cancellation techniques can also be applied to MIMO communication as will now be explained. To adapt an interference canceller to a MIMO system, the channel response matrix H is multiplied by its Hermitian (conjugate transpose) to perform the analog of dispreading. Because the channel response matrix is generally not orthogonal, large amounts of interference between the data streams are usually present after this process. Accordingly, the interference canceller 308 is used to remove this interference and recover the data streams. For example, the interference canceller can be a successive interference canceller, a parallel interference canceller or an iterative interference canceller. Commonly owned co-pending U.S. patent application Ser. No. 11/354,355, filed Feb. 14, 2006, entitled "Method and Device for Mitigation of Multi-User Interference in Code Division Multiple Access" illustrates an iterative interference canceller that can be adapted for use in embodiments of the present invention, and is herein incorporated by reference.

Knowledge of the transmission power levels can significantly enhance operation of the interference canceller 308. If, for example, an iterative interference canceller is used, power distributions usually exist which allow the interference canceller to converge to fully separable and recoverable data streams, which may not be possible when an equal power distribution is used. For predetermined transmission power levels, power distribution information can be provided to the receiver beforehand. In other words, the receiver may have knowledge of the transmit power levels based on preprogrammed information.

Alternately, the transmitter may transmit information describing the data stream power allocations as described above. For example, the transmit data can be partitioned into blocks of data and allocated power varied for each block of data. Power allocations may be transmitted within a block of data to describe power allocations that will be applied to subsequent blocks of data.

Figure 4:
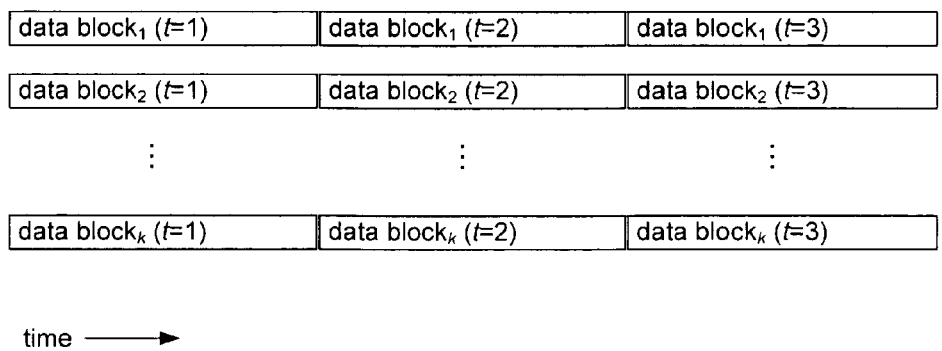
FIG. 4 is a timing diagram showing an exemplary data sequencing in accordance with an embodiment of the present invention.

FIG. 4 illustrates an exemplary data sequencing. At time t=1, data blocks are transmitted for each of the k data streams. The data blocks are transmitted using transmission power allocation $w(1)=\{w_1(1), w_2(1), \ldots w_k(1)\}$. The data blocks can include information embedded therein to describe the planned power levels to be used at a future time. For example, data describing the power level at t=3, w(3), can be encoded within the data blocks transmitted at t=1. At time t=2, data blocks can be transmitted with power allocation w(2) and can include information describing the power level at t=4, w(4), and so on. The receiver may extract power levels from the receive data streams, and use the transmission powers during interference cancellation of the block of data for which it applies.

Figure 5:
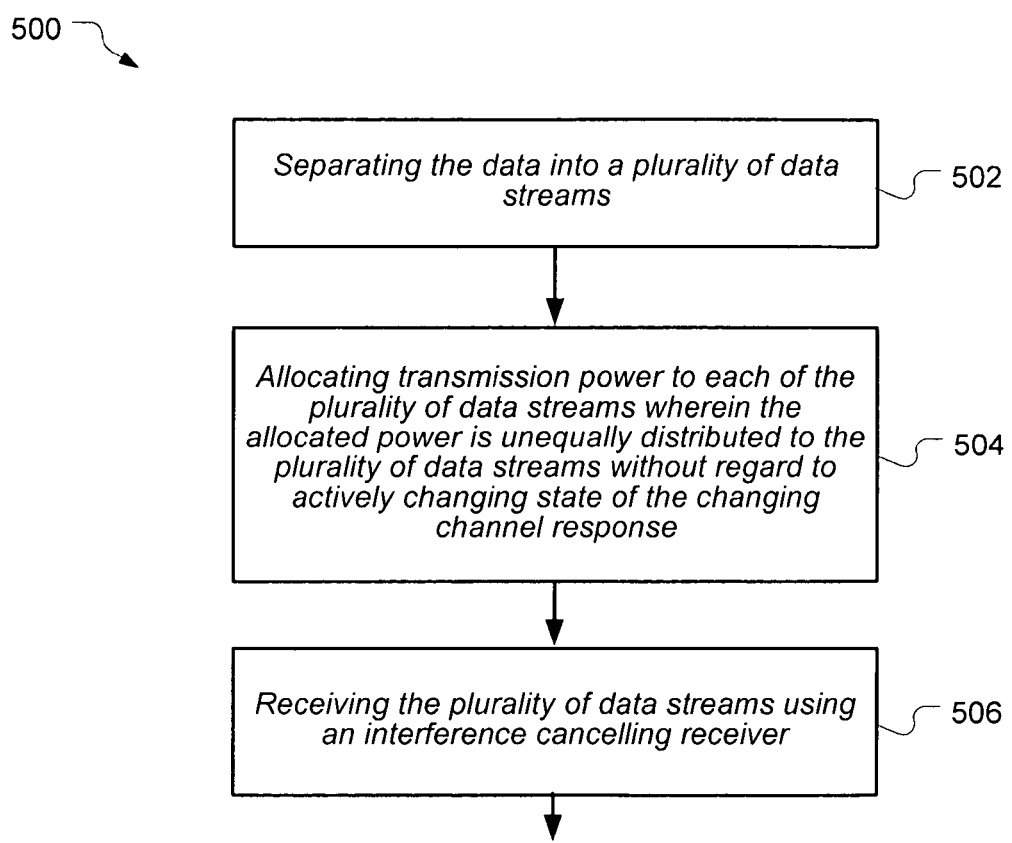
FIG. 5 is a flow chart of a method for communicating data over a MIMO channel in accordance with another embodiment of the present invention.

Finally, a method for communicating data over a multiple-input multiple-output communication channel having a changing channel response will be described in conjunction with FIG. 5. The method, shown generally at 500, can include separating 502 the data into a plurality of data streams. Various ways of separating the data are described above. The method can also include allocating 504 transmission power to each of the plurality of data streams. As described above, the allocated power is unequally distributed to the plurality of data streams without regard to state of the changing channel response. The method can also include receiving 506 the plurality of data streams using an interference cancelling receiver. Various examples of interference cancelling receivers are described above which can be used, although the system is not limited to the example embodiments disclosed.

In general, embodiments of the present invention can help to provide excellent performance for a MIMO system with reduced complexity. An interference canceller is used at the receiver, and non-uniform transmit power levels are applied at the transmitter to capitalize on the strengths of the interference canceller. The non-uniform transmit power levels can be applied without regard to the channel state, helping to reduce or eliminate feedback from the receiver to the transmitter. Complexity is reduced as compared to systems using complex water-filling or beam-forming. Power levels can be assigned by using a predefined set of rotating power levels or by drawing power level assignments from a simple random distribution.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A method for communicating data over a multiple-input multiple-output communication channel having a changing channel response, the method comprising:
   separating the data into a plurality of data streams;
   allocating transmission power to each of the plurality of data streams wherein the allocated power is unequally distributed to the plurality of data streams without regard to state of the changing channel response, wherein the allocating transmission power comprises any of: (a) permuting a predetermined set of transmission powers among the plurality of data streams and (b) assigning a pseudorandomly selected set of transmission powers to the plurality of data streams; and
   receiving the plurality of data streams using an interference cancelling receiver.

2. The method of claim 1, wherein the allocating transmission power comprises assigning a pseudorandomly selected set of transmission powers to the plurality of data streams, and wherein the pseudorandom selection is performed using long term statistics of the changing channel response.

3. The method of claim 1, wherein the plurality of data streams are partitioned into blocks of data and the allocated transmission power is varied for each block of data.

4. The method of claim 1, further comprising communicating information regarding the allocated transmission power to the interference cancelling receiver.

5. The method of claim 1, wherein the allocating transmission power comprises permuting a predetermined set of transmission powers among the plurality of data streams using any of: a predefined ordering, a pseudorandom ordering, and a sequential ordering.

6. The method of claim 1, wherein the allocating transmission power comprises assigning a pseudorandomly selected set of transmission powers to the plurality of data streams, and wherein the pseudorandom selection is performed using a geometrically distributed random variable.

7. A system for transmission over a multiple-input multiple-output communication channel having a changing channel response, the system comprising:
a plurality of transmit antennas;
a transmitter coupled to the plurality of transmit antennas to transmit a plurality of corresponding data streams, wherein each data stream is transmitted using a corresponding data stream power allocation; and
a power allocator coupled to the transmitter and providing the data stream power allocations, wherein the data stream power allocations are unequal and selected without regard to state of the changing channel response and the data stream power allocations are selected by any of: (a) permuting a predetermined set of transmission powers among the data stream power allocations and (b) assigning a pseudorandomly selected set of data stream power allocations.

8. The system of claim 7 wherein the power allocator selects the data stream power allocations using a pseudo-random process, and wherein the pseudo-random process is a geometrically distributed random variable.

9. The system of claim 7 wherein the transmitter transmits information describing the data stream power allocations.

10. The system of claim 7 wherein the power allocator selects the data stream power allocations by permuting the predetermined set of transmission powers and wherein the permuting is any of: a predefined ordering, a pseudorandom ordering, and a sequential ordering.

11. A system for communicating data over a multiple-input multiple-output communication channel having a changing channel response, the system comprising:
a transmitter to accept data, partition the data into a plurality of transmit data streams, and transmit the plurality of transmit data streams into the multiple-input multiple-output communication channel, wherein a power level associated with each transmit data stream is selected without regard to state of the changing channel response and the power levels of at least two of the transmit data streams are unequal and the power levels are selected by any of: (a) permuting a predetermined set of power levels among the transmit data streams and (b) assigning a pseudorandomly selected set of power levels to the transmit data streams; and
a receiver to accept a plurality of received signals from the multiple-input multiple-output communication channel, the receiver comprising an interference canceller configured to extract a plurality of receive data streams from the received signals.

12. The system of claim 11, wherein the interference canceller is an iterative interference canceller.

13. The system of claim 11, wherein the interference canceller is a parallel interference canceller.

14. The system of claim 11, wherein:
the transmitter includes information within the transmit data streams concerning the power levels; and
the receiver extracts information concerning the power levels from the received signals and uses the power levels during interference cancellation.

15. The system of claim 14, wherein the plurality of transmit data streams are broken into blocks and each block includes information associated with the power levels used for a subsequent block.

16. The system of claim 11, wherein the transmitter comprises a power allocator coupled to the transmitter and configured to provide the power level associated with each data stream.

17. The system of claim 16, wherein the power allocator determines the power level by permuting a predetermined set of transmission powers among the plurality of data streams using any of: a predefined ordering, a pseudorandom ordering, and a sequential ordering.

18. The system of claim 16, wherein the power allocator determines the power level by assigning a pseudorandomly selected set of transmission powers to the plurality of data streams using a random process.

19. A system for communicating data over a multiple-input multiple-output communication channel having a changing channel response, the system comprising:
means for separating the data into a plurality of data streams;
means for unequally allocating transmission power to the plurality of data streams without regard to state of the changing channel response, wherein the unequally allocating transmission power comprises any of: (a) permuting a predetermined set of transmission powers among the plurality of data streams and (b) assigning a pseudorandomly selected set of transmission powers to the plurality of data streams; and
means for receiving the plurality of data streams using an interference cancelling receiver.

* * * * *

UNITED STATES PATENT AND TRADEMARK OFFICE
CERTIFICATE OF CORRECTION

PATENT NO. : 7,715,485 B1
APPLICATION NO. : 11/651171
DATED : May 11, 2010
INVENTOR(S) : Schlegel et al.

It is certified that error appears in the above-identified patent and that said Letters Patent is hereby corrected as shown below:

At col. 2, line 32, in the expression "y(t)" the "y" and "t" should each be in italic font
At col. 2, line 33, in the phrase "(e.g., x)" the "x" should be in bold font
At col. 2, line 34, in the phrase "(e.g., H)" the "H" should be in bold font
At col. 2, line 34, in the phrase "variable t" the "t" should be in italic font
At col. 2, line 35, in each place "$x_i$" appears, the "x" should be in bold font
At col. 2, line 36, in the phrase "as x" the "x" should be in bold font
At col. 2, line 47, in each place "y(t)" appears the "y" should be in bold font
At col. 2, lines 47-48, in each place "y" and "t" appears in the phrase "$\{y_i(t)\} = \{y_1(t), y_2(t), \ldots y_j(t)\}$, where $y_i(t)$" the "y" and the "t" should be in italic font
At col. 2, line 51, the equation should read: $\mathbf{y}(t) = \mathbf{H}(t)\mathbf{x}(t)+\mathbf{z}(t)$
At col. 2, line 53, in each place "x(t)" appears the "x" should be in bold font
At col. 2, line 53, in each place "x" and "t" appears in the phrase "$\{x_i(t)\} = \{x_1(t), x_2(t), \ldots x_j(t)\}, x_i(t)$" the "x" and the "t" should be in italic font
At col. 2, line 55, it should read "... $i, j$ is the number of receive antennas, $k$ is the ..."
At col. 2, line 56, it should read "... $\mathbf{H}(t)$ is the channel response and $\mathbf{z}(t)$ represents ..."
At col. 2, line 57, it should read "... H is a $k$ row by $j$ column matrix..."
At col. 2, line 59, in the phrase "matrix H" the "H" should be in bold font
At col. 2, line 64, in the phrase "k transmit" the "k" should be in italic font
At col. 2, line 65, in the phrase "k data" the "k" should be in italic font
At col. 2, line 67, the phrase "d(t) ={$d_i$(t)}, i=1" should read "$\mathbf{d}(t) = \{d_i(t)\}, i = 1$"
At col. 3, line 1, in the phrase "k." the "k" should be in italic font
At col. 3, line 2, in the phrase "into k" the "k" should be in italic font
At col. 3, line 5, the expression "{$w_k$}" should be "$\{w_k\}$"
At col. 3, line 27, the expression "$w_T$" should be "$w_T$"
At col. 3, line 36, the expression "H(t)" should be "$\mathbf{H}(t)$"
At col. 3, line 39, the "H" should be in bold font
At col. 3, line 40, in the expression "t." the "t" should be in italic font
At col. 3, line 41, in the phrase "time t" the "t" should be in italic font
At col. 3, line 41, the expression "H(t)" should be "$\mathbf{H}(t)$"
At col. 3, line 53, the expression "H(t)" should be "$\mathbf{H}(t)$"
At col. 4, line 2, in the expression "$W_T = 1$" the "W" should be in italic font Signed and Sealed this Twenty-second Day of June, 2010

David J. Kappos
*Director of the United States Patent and Trademark Office*

At col. 4, line 50, in the expression "{w$_i$}" the "w" should be in italic font
At col. 5, line 11, in the expression "(k)" the "k" should be in italic font
At col. 5, line 12, in the expression "(j)" the "j" should be in italic font
At col. 5, line 26, the "H" should be in bold font
At col. 5, line 61, in the expression "t=1" the "t" should be in italic font
At col. 5, line 61, in the expression "k data" the "k" should be in italic font
At col. 5, line 63, the expression "w(1) = {w$_1$(1), w$_2$(1), .... w$_k$(1)}" should be "w(1) = {$w_1$(1), $w_2$(1), .... $w_k$(1)}"
At col. 5, line 66, the expression "t=3, w(3)" should be "$t$=3, w(3)"
At col. 5, line 67, in both places where "t=" the "t" should be in italic font
At col. 6, line 1, in the expression "w(2)" the "w" should be in italic font
At col. 6, line 2, the expression "t=4, w(4)" should be "$t$=4, w(4)"